(12) United States Patent
Teshigawara et al.

(10) Patent No.: US 10,713,823 B2
(45) Date of Patent: *Jul. 14, 2020

(54) IMAGE RECONSTRUCTING APPARATUS AND IMAGE RECONSTRUCTING METHOD

(71) Applicant: TOSHIBA MEDICAL SYSYTEMS CORPORATION, Otawara-Shi, Tochigi-Ken (JP)

(72) Inventors: Manabu Teshigawara, Otawara (JP); Takuzo Takayama, Otawara (JP); Tomoyasu Komori, Otawara (JP); Takaya Umehara, Kuki (JP)

(73) Assignee: TOSHIBA MEDICAL SYSTEMS CORPORATION, Philadelphia (JP)

(*) Notice: Subject to any disclaimer, the term of this patent is extended or adjusted under 35 U.S.C. 154(b) by 448 days.

This patent is subject to a terminal disclaimer.

(21) Appl. No.: 15/598,091

(22) Filed: Jun. 2, 2017

(65) Prior Publication Data
US 2017/0263022 A1 Sep. 14, 2017

Related U.S. Application Data

(63) Continuation of application No. 12/699,387, filed on Feb. 3, 2010, now Pat. No. 9,747,706.

(30) Foreign Application Priority Data

Feb. 5, 2009 (JP) ................. 2009-025105
Dec. 22, 2009 (JP) ................. 2009-291069

(51) Int. Cl.
*G06T 11/00* (2006.01)
(52) U.S. Cl.
CPC ....... *G06T 11/006* (2013.01); *G06T 2211/421* (2013.01)

(58) Field of Classification Search
None
See application file for complete search history.

(56) References Cited

U.S. PATENT DOCUMENTS 5,218,534 A * 6/1993 Trousset ............... G06T 11/006
345/424
5,546,472 A 8/1996 Levin
(Continued)

FOREIGN PATENT DOCUMENTS

JP 04-275685 A 10/1992
JP 05-244508 A 9/1993
(Continued)

OTHER PUBLICATIONS

Japanese Office Action with its English Translation for Japanese Patent Application No. 2009-291069 dated Oct. 22, 2013.
(Continued)

*Primary Examiner* — Bernard Krasnic
(74) *Attorney, Agent, or Firm* — Ken ichiro Yoshida

(57) ABSTRACT

When a group of (pre-processed) projection data is stored into a projection-data storage unit, a Gaussian-based expansion-data creating unit creates a group of Gaussian-based expansion data that is expanded from each of the group of projection data through linear combination based on a plurality of Gaussian functions that is stored by a Gaussian-function storage unit and has different center points. A reconstruction-image creating unit then creates a reconstruction image by using the Gaussian-based expansion-data created by the Gaussian-based expansion-data creating unit, and stores the created reconstruction image into an image storage unit.

3 Claims, 9 Drawing Sheets

(56) References Cited

U.S. PATENT DOCUMENTS

| | | | |
|---|---|---|---|
| 8,170,360 B2 | 5/2012 | Pace et al. | |
| 9,747,706 B2 * | 8/2017 | Teshigawara | ......... G06T 11/006 |
| 2010/0054590 A1 | 3/2010 | Jiang et al. | |

FOREIGN PATENT DOCUMENTS

| | | | |
|---|---|---|---|
| JP | 11-510630 A | 9/1999 |
| JP | 2003-294842 A | 10/2003 |
| JP | 2004-212256 A | 7/2004 |
| JP | 2005-218693 A | 8/2005 |
| WO | 97/06477 A2 | 2/1997 |

OTHER PUBLICATIONS

"Medical Image/Radiological Equipment Hand Book", edited by Japan Industries Association of Radiological Systems, Nago Bijutsu Insatsu Kabushiki Kaisha, 2001, pp. 143-146 (partial English translation).

* cited by examiner

REAL-SPACE → FOURIER TRANSFORM → FREQUENCY SPACE

IMAGE RECONSTRUCTING APPARATUS AND IMAGE RECONSTRUCTING METHOD

CROSS-REFERENCE TO RELATED APPLICATIONS

This application is a continuation of U.S. patent application Ser. No. 12/699,387 filed on Feb. 3, 2010, which issued on Aug. 29, 2017 as U.S. Pat. No. 9,747,706 and is based upon and claims the benefit of priority from the prior Japanese Patent Application No. 2009-25105, filed on Feb. 5, 2009, and Japanese Patent Application No. 2009-291069, filed on Dec. 22, 2009 as well as U.S. patent application Ser. No. 12/699,387 filed on Feb. 3, 2010; the entire contents of both of which are incorporated herein by reference.

BACKGROUND OF THE INVENTION

1. Field of the Invention

The present invention relates to an image reconstructing apparatus and an image reconstructing method.

2. Description of the Related Art

Conventionally, a Filtered Back Projection (FBP) method is performed as a method of reconstructing a tomographic image from projection data based upon X-rays or gamma rays using a radiodiagnosis apparatus such as an X-ray Computed Tomography (CT) apparatus, a Positron Emission computed Tomography (PET) apparatus, a Single Photon Emission Computed Tomography (SPECT), or non-destructive examination equipment.

The FBP method is an image reconstructing method that uses the Central Section Theorem which states that "a Fourier transform of a projection toward a direction of an original image is equal to a section that is perpendicular to the projection direction and runs through the center in a two-dimensional Fourier transform of the original image." The Central Section Theorem is explained below with reference to FIG. 11. FIG. 11 is a schematic diagram for explaining the Central Section Theorem.

First of all, as shown in FIG. 11, it is assumed where (x, y) denotes a rotating coordinate system having an inclination of an angle "$\phi$" to an orthogonal coordinate system at rest (X, Y) in a real-space having the origin at a scan center, and "F" denotes data two-dimensionally Fourier-transformed from an original image "f".

As shown in FIG. 11, The Central Section Theorem is that data that is one-dimensionally Fourier-transformed from projection data in a projection direction parallel to the "y axis" of the original image "f" is equal to the cross section of "F" with the perpendicular plane of the "k axis" having the inclination of the angle "$\phi$" to an orthogonal coordinate system at rest ($V_X$, $V_Y$) in a frequency space.

In other words, according to the Central Section Theorem, by one-dimensionally Fourier-transforming each of projection data in each projection direction, data "F" that is two-dimensionally Fourier-transformed from the original image "f" can be obtained.

According to the FBP method, sinogram data that the projection data in each projection direction is summed with respect to each coordinate section is Fourier-transformed, and then, for example, low-pass filter processing such as Ramp filtering for deleting high-frequency component is performed to remove statistical noise. According to the FBP method, a tomographic image is reconstructed by sequentially performing an inverse Fourier transform and back projection processing on the filtered Fourier-transformed data (for example, see "Medical Image/Radiological Equipment Hand Book" edited by Japan Industries Association of Radiological Systems, published by Nago Bijutsu Insatsu Kabushiki Kaisha, 2001, pp. 143-146).

According to the conventional technology described above, a high-frequency component that is deleted through the low-pass filter includes information for reproducing a profile of a structure through which radioactive rays have passed.

For this reason, the conventional technology as described above has a problem that because statistical noises are removed, the profile of the structure on a reconstructed image is blurred in an adverse manner that the picture quality of the reconstructed image is degraded.

SUMMARY OF THE INVENTION

According to an aspect of the present invention, an image reconstructing apparatus includes a Gaussian-based expansion-data group creating unit that creates a group of Gaussian-based expansion data that is expanded from each of a group of projection data through linear combination based on a plurality of Gaussian functions having different center points; and a reconstruction-image creating unit that creates a reconstruction image by performing one of two sequences of processing sequentially on each of the group of the Gaussian-based expansion data created by the Gaussian-based expansion-data group creating unit, the two sequences of processing including a sequence of Fourier transform processing, one-dimensional inverse-Fourier transform processing, and back projection processing, and a sequence of Fourier transform processing and two-dimensional inverse-Fourier transform processing.

According to another aspect of the present invention, an image reconstructing apparatus includes a reconstruction-image creating unit that calculates two-dimensional Gaussian-expansion coefficients to be a base for expanding a group of projection data by a plurality of two-dimensional Gaussian functions that is uniformly arranged in a field of view of a reconstruction image and has different center points, thereby creating a reconstruction image processed from the group of the projection data through back projection processing.

According to still another aspect of the present invention, an image reconstructing method includes creating by a Gaussian-based expansion-data group creating unit a group of Gaussian-based expansion data that is expanded from each of a group of projection data through linear combination based on a plurality of Gaussian functions having different center points; and creating by a reconstruction-image creating unit a reconstruction image by sequentially performing one of two sequences of processing on each of the group of the Gaussian-based expansion data created by the Gaussian-based expansion-data group creating unit, the two sequences of processing including a sequence of Fourier transform processing, one-dimensional inverse-Fourier transform processing, and back projection processing, and a sequence of Fourier transform processing and two-dimensional inverse-Fourier transform processing.

According to still another aspect of the present invention, an image reconstructing method includes creating by a reconstruction-image creating unit a reconstruction image processed from a group of projection data through back projection processing by calculating two-dimensional Gaussian-expansion coefficients to be a base for expanding the group of the projection data by a plurality of two-dimensional Gaussian functions that is uniformly arranged in a field of view of a reconstruction image and has different center points.

DETAILED DESCRIPTION OF THE INVENTION

Exemplary embodiments of an image reconstructing apparatus and an image reconstructing method according to the present invention will be explained below in detail with reference to the accompanying drawings. Explained below are cases where the present invention is applied to an X-ray Computed Tomography (CT) apparatus. Hereinafter, an X-ray Computed Tomography apparatus is referred to as an X-ray CT apparatus in an abbreviated form.

Figure 1:
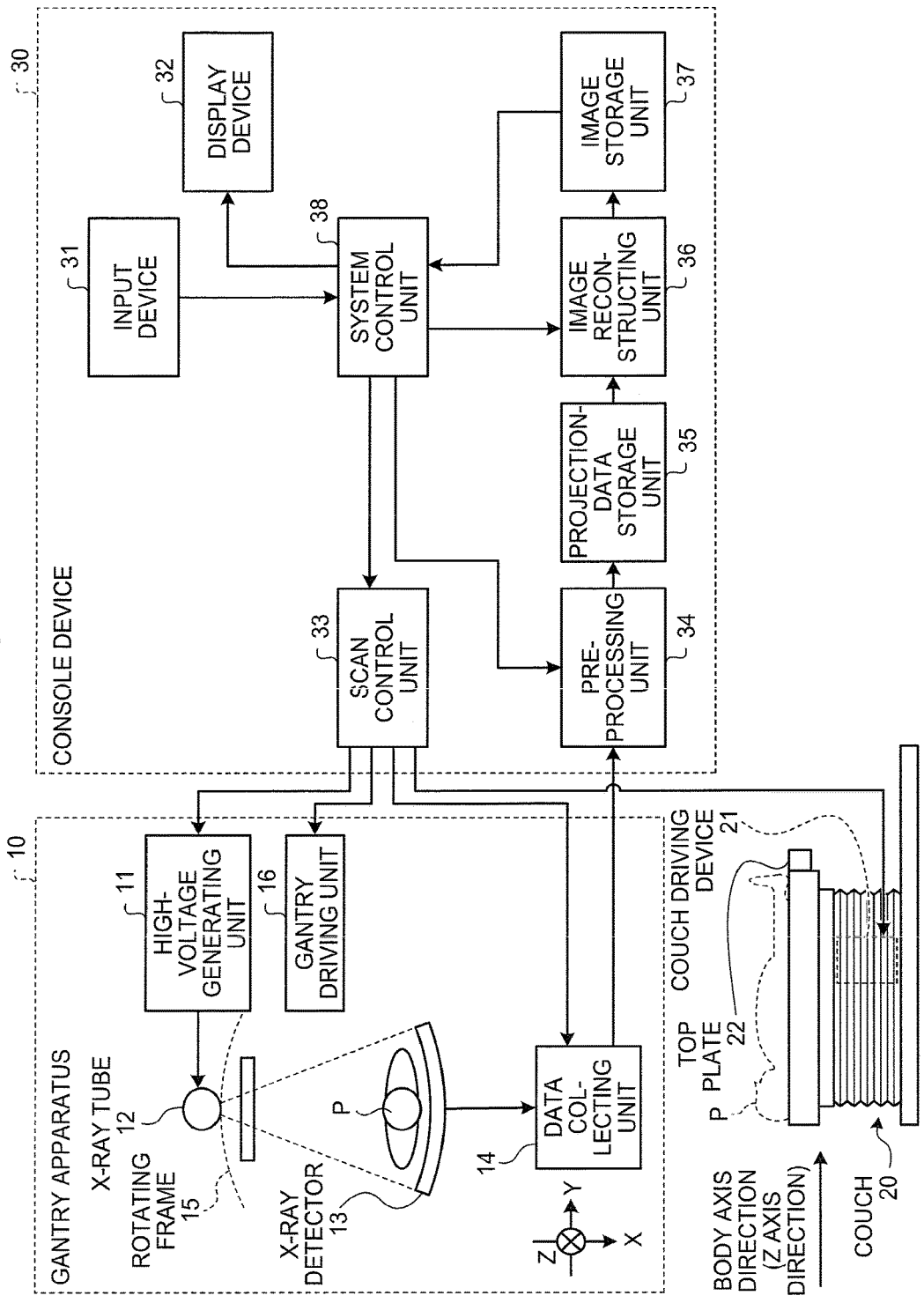
FIG. 1 is a schematic diagram for explaining a configuration of an X-ray Computed Tomography (CT) apparatus according to a first embodiment of the present invention.

First of all, a configuration of an X-ray CT apparatus according to a first embodiment of the present invention is explained below with reference to FIG. 1. FIG. 1 is a schematic diagram for explaining a configuration of the X-ray CT apparatus according to the first embodiment. As shown in FIG. 1, the X-ray CT apparatus according to the first embodiment includes a gantry apparatus 10, a couch 20, and a console device 30.

The gantry apparatus 10 is an apparatus that radiates X-rays to a subject P and then collects a group of projection data, and includes a high-voltage generating unit 11, an X-ray tube 12, an X-ray detector 13, a data collecting unit 14, a rotating frame 15, and a gantry driving unit 16.

The high-voltage generating unit 11 is a device that generates a high voltage, and supplies the generated high voltage to the X-ray tube 12.

The X-ray tube 12 generates an X-ray with a high voltage supplied by the high-voltage generating unit 11, and the X-ray generated by the X-ray tube 12 is irradiated to a subject P.

The X-ray detector 13 is a detector that detects X-ray strength distribution data indicating a strength distribution of X-rays that are irradiated from the X-ray tube 12 and have passed through the subject P, and includes a plurality of X-ray detecting elements that are arranged in a channel direction along the y axis as shown in FIG. 1.

The rotating frame 15 supports the X-ray tube 12 and the X-ray detector 13 on opposite sides of the subject P; and the gantry driving unit 16 rotates the X-ray tube 12 and the X-ray detector 13 in a circular orbit whose center is the subject P by rotationally driving the rotating frame 15.

The data collecting unit 14 is a device that creates projection data by performing amplification processing, analog-to-digital (A/D) conversion processing and the like onto the X-ray strength distribution data detected by the X-ray detector 13, and collects a group of the projection data by creating projection data from each X-ray strength distribution data corresponding to each X-ray radiation direction from the X-ray tube 12. The data collecting unit 14 then transmits a group of the collected projection data to the console device 30, which will be described later.

The couch 20 is equipment on which the subject P is to be placed, and includes a top plate 22 and a couch driving device 21, as shown in FIG. 1. The top plate 22 is a bed on which the subject P is to be placed, and the couch driving device 21 moves the subject P into the inside of the rotating frame 15 by moving the top plate 22 in the body axis direction of the subject P (z axis direction).

The console device 30 is a device that receives an operation onto the X-ray CT apparatus by an operator, and reconstructs a tomographic image from a group of projection data collected via the gantry apparatus 10, and includes an input device 31, a display device 32, a scan control unit 33, a preprocessing unit 34, a projection-data storage unit 35, an image reconstructing unit 36, an image storage unit 37, and a system control unit 38, as shown in FIG. 1.

The input device 31 includes a mouse, a keyboard, a button, a track ball, a joy stick, and/or the like, for a doctor or an engineer who operates the X-ray CT apparatus to input various instructions, and transfers various commands received from the operator to the system control unit 38, which will be described later.

The display device 32 includes a monitor configured to display a Graphical User Interface (GUI) for receiving an instruction from the operator via the input device 31, and to display a reconstruction image stored by the image storage unit 37, which will be described later.

The scan control unit 33 controls processing of scanning the subject P with X-rays by the gantry apparatus 10 and processing of collecting a group of projection data by controlling operation of the high-voltage generating unit 11, the gantry driving unit 16, the data collecting unit 14, and the couch driving device 21.

The preprocessing unit 34 performs preprocessing, such as sensitivity correction, on each of the group of the projection data received from the data collecting unit 14, and creates a group of preprocessed projection data, and the projection-data storage unit 35 stores therein the group of the preprocessed projection data created by the preprocessing unit 34.

The image reconstructing unit 36 is a processing unit that creates a reconstruction image (tomography image) from preprocessed projection data stored by the projection-data storage unit 35 by using the Central Section Theorem, and will be explained later in detail.

The image storage unit 37 stores therein a reconstruction image created by the image reconstructing unit 36.

The system control unit 38 provides overall control of the X-ray CT apparatus by controlling operation of the gantry apparatus 10, the couch 20, and the console device 30.

Specifically, the system control unit 38 controls projection-data group collecting processing by the gantry apparatus 10 and the couch 20 by controlling the scan control unit 33 based on an instruction of the operator transferred from the input device 31. Moreover, the system control unit 38 controls image reconstruction by the console device 30 by controlling the preprocessing unit 34 and the image reconstructing unit 36 based on an instruction of the operator transferred from the input device 31. Furthermore, the system control unit 38 provides control so as to read a reconstruction image from the image storage unit and to display it on a monitor included in the display device 32.

In this way, the X-ray CT apparatus according to the first embodiment has creates a reconstruction image from a group of preprocessed projection data created by the preprocessing unit 34 and stored by the projection-data storage unit 35, and has a main feature such that the X-ray CT apparatus can improve the picture quality of the reconstruction image by executing processing performed by the image reconstructing unit 36 that will be explained below in detail.

Figure 2:
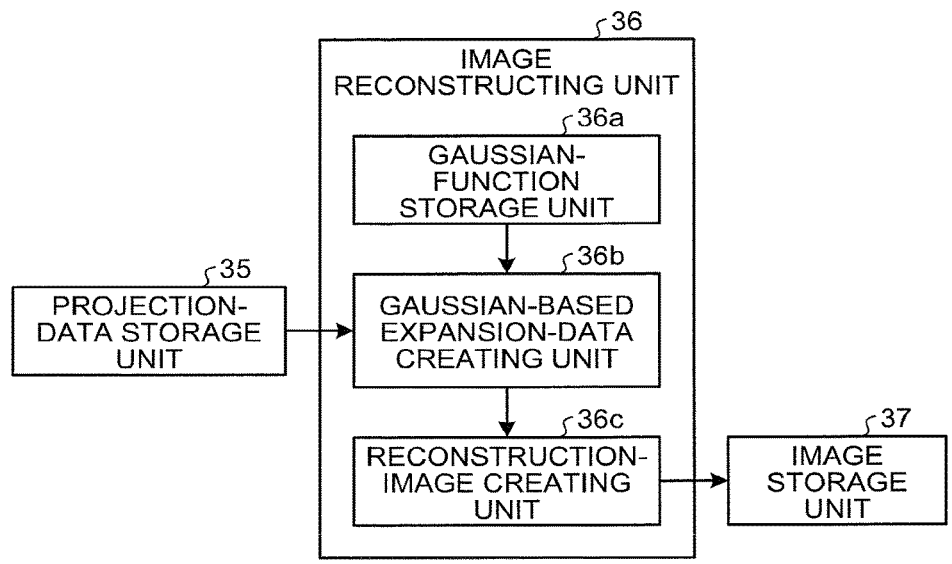
FIG. 2 is a schematic diagram for explaining a configuration of an image reconstructing unit according to the first embodiment.
Figure 3:
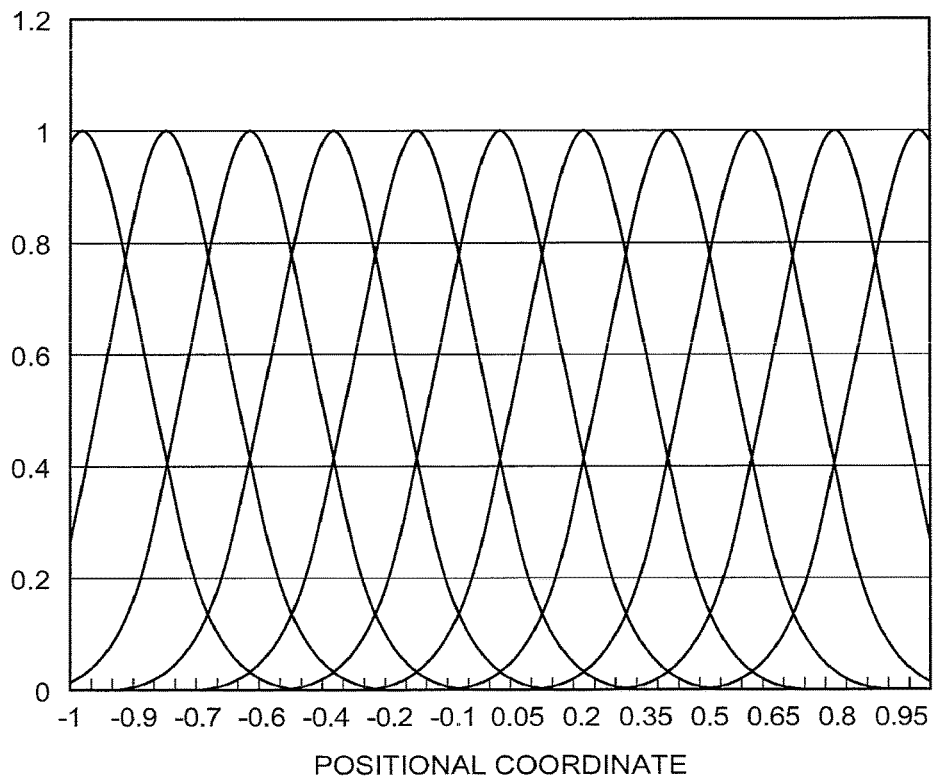
FIG. 3 is a schematic diagram for explaining a Gaussian-function storage unit according to the first embodiment.
Figure 4:
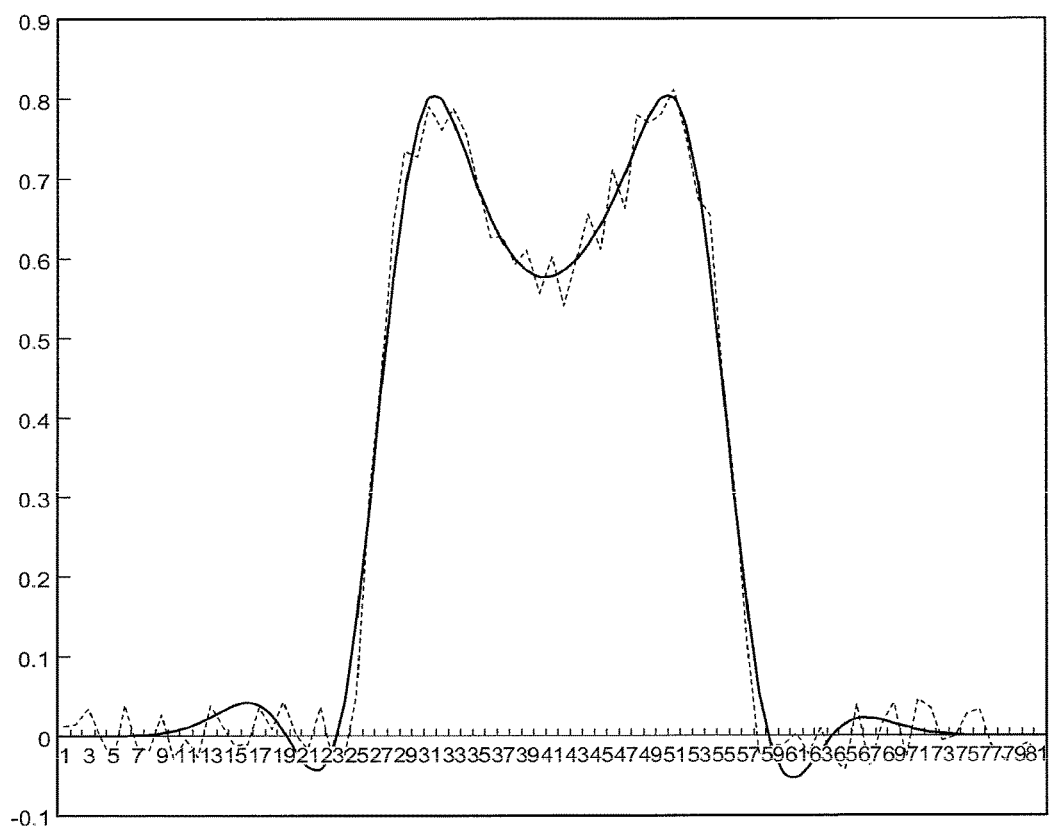
FIG. 4 is a schematic diagram for explaining a Gaussian-based expansion-data creating unit according to the first embodiment.
Figure 5:
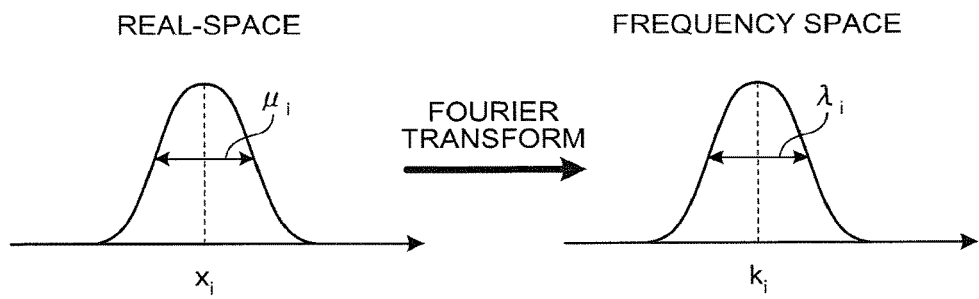
FIG. 5 is a schematic diagram for explaining Fourier transform processing performed by a reconstruction-image creating unity.

The main feature is explained below with reference to FIGS. 2 to 5. FIG. 2 is a schematic diagram for explaining a configuration of the image reconstructing unit according to the first embodiment. FIG. 3 is a schematic diagram for explaining a Gaussian-function storage unit according to the first embodiment. FIG. 4 is a schematic diagram for explaining a Gaussian-based expansion-data creating unit according to the first embodiment. FIG. 5 is a schematic diagram for explaining Fourier transform processing performed by a reconstruction-image creating unit.

As shown in FIG. 2, the image reconstructing unit 36 according to the first embodiment includes a Gaussian-function storage unit 36a, a Gaussian-based expansion-data creating unit 36b, and a reconstruction-image creating unit 36c.

The Gaussian-function storage unit 36a stores therein a plurality of Gaussian functions having different center points. For example, the Gaussian-function storage unit 36a stores therein a plurality of Gaussian functions that have the same peak value and the same distribution value, but have respective center points at positional coordinates that are distributed with regular intervals as shown in FIG. 3.

The Gaussian-based expansion-data creating unit 36b creates a group of the Gaussian-based expansion data that is expanded from each of a group of the preprocessed projection data stored in the projection-data storage unit 35 through linear combination based on a plurality of the Gaussian functions that is stored in the Gaussian-function storage unit 36a and that has different center points.

Hereinafter, "a group of preprocessed projection data" and "preprocessed projection data" stored in the projection-data storage unit 35 will be respectively referenced in shortened manner as "a group of projection data" and "projection data."

It is assumed where "S(x)" denotes projection data in the x axis direction obtained by radiating an X-ray in parallel to "the y axis" in the rotating coordinate system (x, y) having the inclination of an angle "φ" to the orthogonal coordinate system at rest (X, Y) in the real-space, the Gaussian-based expansion-data creating unit 36b creates from the projection data "S(x)" Gaussian-based expansion data expressed by Expression (1) described below through linear combination that uses expansion coefficients ($a_1$ to $a_N$) based on "N" Gaussian functions ($G_1(x)$ to $G_N(x)$) stored by the Gaussian-function storage unit 36a.

$$S(x) = \sum_{i=1}^{N} a_i G_i(x) \quad (1)$$

The Gaussian-based expansion-data creating unit 36b calculates a expansion coefficient "$a_i$" by Expression (2) described below.

$$\begin{cases} S_i = \int_{-b}^{b} S(x) G_i(x) \\ g_{ij} = \int_{-b}^{b} G_i(x) G_j(x) dx \end{cases} \quad (2)$$

$$\begin{pmatrix} a_1 \\ \vdots \\ \vdots \\ a_n \end{pmatrix} = \begin{pmatrix} g_{11} & \cdots & \cdots & g_{1n} \\ \vdots & \ddots & & \vdots \\ \vdots & & \ddots & \vdots \\ g_{n1} & \cdots & \cdots & g_{nn} \end{pmatrix}^{-1} \begin{pmatrix} s_1 \\ \vdots \\ \vdots \\ s_n \end{pmatrix}$$

Precisely, the Gaussian-based expansion-data creating unit 36b calculates the expansion coefficient "$a_i$" of $G_i(x)$ by calculating an inner product of each count of projection data "S(x)" and $G_i(x)$ within a range between "−b" to "b" on the x axis of the rotating coordinate system. The range between "−b" to "b" for calculating inner products is a numerical value set by the operator based on a parameter such as a field of view of the X-ray CT apparatus and so on.

Accordingly, as shown in FIG. 4, the Gaussian-based expansion-data creating unit 36b creates the Gaussian-based expansion data without statistical noise as indicated by a waveform of the solid line by expanding projection data including a statistical noise as indicated by a waveform the broken line using the Gaussian functions.

The Gaussian-based expansion-data creating unit 36b then creates a group of Gaussian-based expansion data by executing the Gaussian-function expansion processing on every one of the group of the projection data described above.

The first embodiment is explained above in a case where the Gaussian functions to be a base, which are stored in the Gaussian-function storage unit 36a, have the same peak value and the same distribution value, and respective center pointes of the Gaussian functions are uniformly arranged with regular intervals. However, the present invention is not limited to this, and a peak value, a distribution value, and an interval arrangement of the center point of each Gaussian function can be arbitrarily changed and set by the operator.

Returning to FIG. 2, the reconstruction-image creating unit 36c performs Fourier transform processing on each of a group of Gaussian-based expansion data created by the Gaussian-based expansion-data creating unit 36b.

Because a Fourier-transformed Gaussian function becomes a Gaussian function, the reconstruction-image creating unit 36c can perform Fourier transform processing by calculating a simple sum of product without calculating integration of numerical values over a very wide frequency band as a Fourier transform does according to the conventional Filtered Back Projection (FBP) method.

The following description explains with reference to FIG. 5 that a Fourier transform performed by the reconstruction-image creating unit 36c becomes a simple sum of product. At first, it is assumed, as shown in FIG. 5, where "$x_i$" denotes the positional coordinate of a center point in the real-space and "$\mu_i$" denotes the distribution value, the Gaussian function "$G_i(x)$" stored in the Gaussian-function storage unit 36a will be described below as Expression (3). A letter "A" shown in Expression (3) denotes a normalization constant.

$$\begin{cases} G_i(x) = Ae^{-\left(\frac{x-x_i}{\mu_i}\right)^2} \\ A = \frac{1}{\mu_i}\sqrt{\frac{1}{\pi}} \end{cases} \quad (3)$$

The Gaussian function obtained as a result of a Fourier transform of "$G_i(x)$" is described below as Expression (4), where "$k_i$" denotes the positional coordinate of a center point in the frequency space, and "$\lambda_i$" denotes the distribution value, as shown in FIG. 5. A letter "N" shown in Expression (4) denotes a normalization constant.

$$\begin{cases} \hat{F}G_i(x) = \tilde{G}_i(k) = Ne^{-\left(\frac{k-k_i}{\lambda_i}\right)^2} \\ N = \frac{1}{\lambda_i}\sqrt{\frac{1}{\pi}} \end{cases} \quad (4)$$

As explained above with reference to Expression (1), because the projection data "S(x)" is expressed by a sum of products of "$G_i(x)$" and the expansion coefficient "$a_i$" (i=1 to N), a result of a Fourier transform of the projection data "S(x)" is expressed by a sum of products of "a Gaussian function of Fourier-transformed $G_i(x)$ and the expansion coefficient "$a_i$" (i=1 to N), as described below by Expression (5).

$$\begin{aligned} \hat{F}S(x) &= \tilde{S}(k) \\ &= \hat{F}\left(\sum_{i=1}^{N} a_i G_i(x)\right) \\ &= \sum_{i=1}^{N} a_i \hat{F}G_i(x) \\ &= \sum_{i=1}^{N} a_i \tilde{G}_i(k) \end{aligned} \quad (5)$$

In this way, the reconstruction-image creating unit 36c executes a Fourier transform on each of the group of the Gaussian-based expansion data by calculating a simple sum of products directly using each expansion coefficient that is calculated when expanding each projection data by a Gaussian function.

The reconstruction-image creating unit 36c then creates a reconstruction image by using a group of Fourier-transformed data, and stores the created reconstruction image into the image storage unit 37. Specifically, the reconstruction-image creating unit 36c sequentially performs one-dimensional inverse-Fourier transform processing and back projection processing on each of a group of Fourier-transformed data, thereby creating a reconstruction image. Alternatively, the reconstruction-image creating unit 36c performs two-dimensional inverse-Fourier transform processing on each of a group of Fourier-transformed data, thereby creating a reconstruction image.

Figure 6:
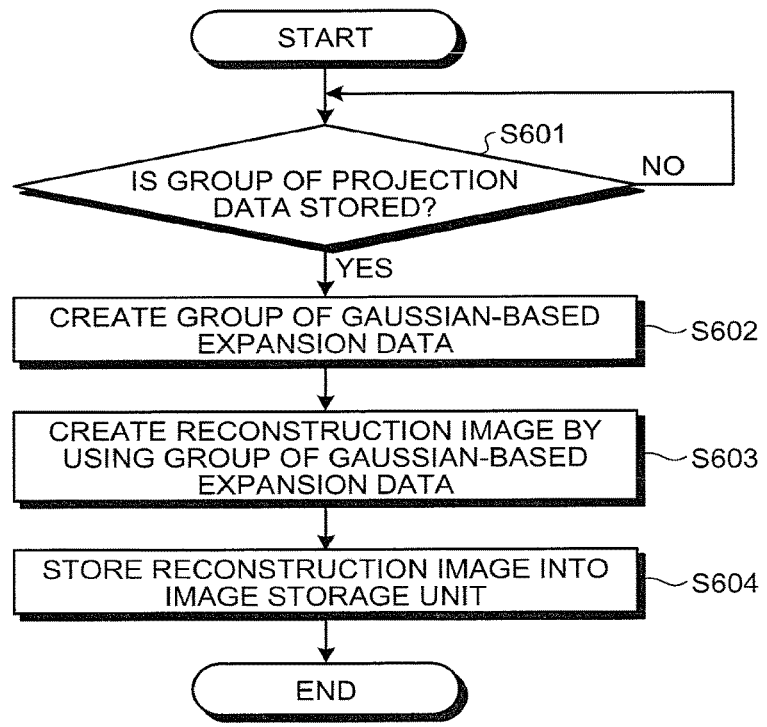
FIG. 6 is a flowchart for explaining image reconstruction processing by the X-ray CT apparatus according to the first embodiment.

A flow of image reconstruction processing by the X-ray CT apparatus according to the first embodiment is explained below with reference to FIG. 6. FIG. 6 is a flowchart for explaining image reconstruction processing by the X-ray CT apparatus according to the first embodiment.

As shown in FIG. 6, in the X-ray CT apparatus according to the first embodiment, when the projection-data storage unit 35 stores therein a group of projection data (that are preprocessed) (Yes at Step S601), the Gaussian-based expansion-data creating unit 36b creates a group of Gaussian-based expansion data that is expanded from each of the group of the projection data through linear combination based on a plurality of Gaussian functions that is stored by the Gaussian-function storage unit 36a and has different center points (Step S602, see Expression (1)). In other words, the Gaussian-based expansion-data creating unit 36b calculates a expansion coefficient by calculating an inner product of each count of projection data and a Gaussian function to be a base, thereby creating Gaussian-based expansion data (see Expression (2)).

The reconstruction-image creating unit 36c then creates a reconstruction image by using the group of the Gaussian-based expansion data created by the Gaussian-based expansion-data creating unit 36b (Step S603). Specifically, the reconstruction-image creating unit 36c sequentially performs Fourier transform processing, one-dimensional inverse-Fourier transform processing, and back projection processing on each of the group of the Gaussian-based expansion data, thereby creating a reconstruction image. Alternatively, the reconstruction-image creating unit 36c sequentially performs Fourier transform processing and two-dimensional inverse-Fourier transform processing on each of the group of the Gaussian-based expansion data, thereby creating a reconstruction image.

After that, the reconstruction-image creating unit 36c stores the created reconstruction image into the image storage unit 37 (Step S604), and then terminates the processing.

As described above, according to the first embodiment, the Gaussian-based expansion-data creating unit 36b creates a group of Gaussian-based expansion data that is expanded from each of a group of projection data through linear combination based on a plurality of Gaussian functions that is stored in the Gaussian-function storage unit 36a and has different center points. The reconstruction-image creating unit 36c then creates a reconstruction image by using the group of the Gaussian-based expansion data that is generated by the Gaussian-based expansion-data creating unit 36b. Consequently, according to the first embodiment, statistical noises can be removed from projection data while high-frequency components corresponding to the profile information on internal structures of the subject P are left without executing low-pass filter processing using a filter such as a Ramp filter or a Gaussian filter, which is performed in deconvolution by the conventional FBP method, and a reconstruction image that clearly reproduces the profile of internal structures of the subject P can be generated. Ultimately, as described above as the main feature, the picture quality of a reconstruction image can be improved.

Moreover, according to the first embodiment, because Gaussian-based expansion data is Fourier-transformed, a calculation amount can be reduced to a large extent by executing Fourier transform processing by a sum of product directly using a expansion coefficient that is calculated for creating Gaussian-based expansion data and without calculating a Fourier coefficient by integration of numerical values as performed by the conventional FBP method. Consequently, a reconstruction image can be rapidly created.

Although the first embodiment is explained above in a case where a plurality of Gaussian functions to be used as a base when creating Gaussian-based expansion data is the same, a second embodiment of the present invention is explained below in a case where a plurality of Gaussian functions to be used as a base when creating Gaussian-based expansion data is changed in accordance with a projection direction of projection data.

Although the image reconstructing unit 36 according to the second embodiment has a similar configuration to that of the image reconstructing unit 36 according to the first embodiment explained with reference to FIG. 2, the contents that are stored in the Gaussian-function storage unit 36a and the details of processing as performed by the Gaussian-based expansion-data creating unit 36b are different from the first embodiment. Those differences will be explained below.

Figure 7A:
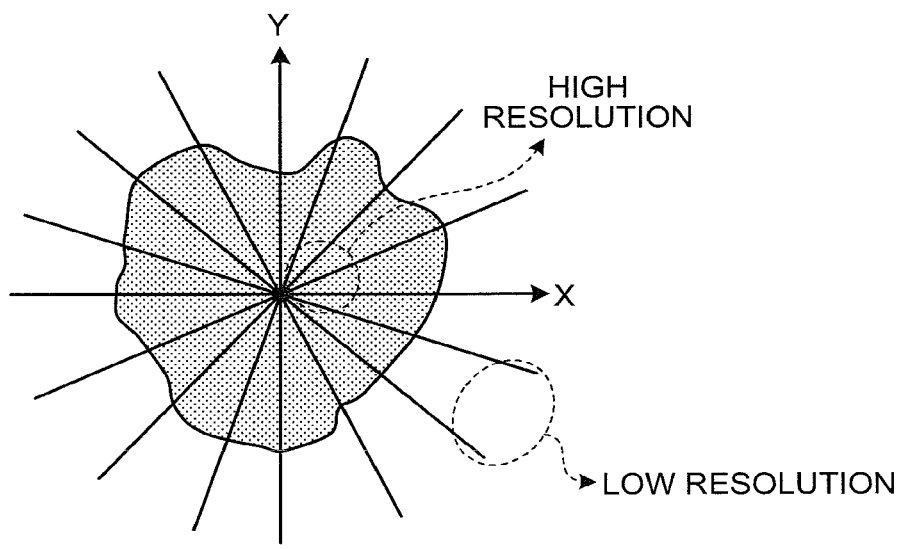
FIGS. 7A and 7B are schematic diagrams for explaining features of a reconstruction image created by Filtered Back Projection (FBP) method.
Figure 7B:
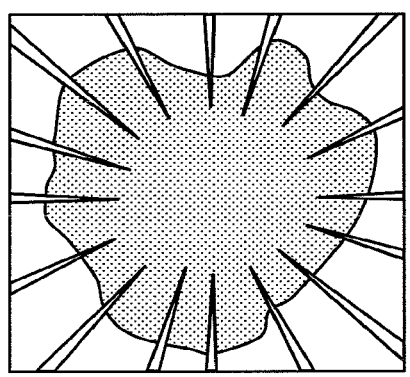

At first, the features of a reconstruction image created by the FBP method are explained below with reference to FIGS. 7A and 7B. FIGS. 7A and 7B are schematic diagrams for explaining the features of a reconstruction image created by the FBP method.

According to the FBP method, because each projection data is processed in a rotating coordinate system of each projection direction, a data volume in the periphery of a field of view is less than the data volume in the center of the field of view. For this reason, in a reconstruction image according to the FBP method as shown in FIG. 7A, the center of the field of view is in high resolution while the periphery of the field of view is in low resolution. As a result, the spatial resolution of an image is not uniform.

Moreover, on a reconstruction image according to the FBP method, because each projection data is processed in a rotating coordinate system of each projection direction, as shown in FIG. 7B, a radial false image (streak artifact) centering at a point, such as the coordinate center, is produced.

As described in the first embodiment, even when Gaussian-based expansion data is created from projection data based on a Gaussian function in a rotating coordinate system, there is a possibility that the spatial resolution of an image may not be uniform, or a streak artifact may be produced in some cases, as explained above with reference to FIGS. 7A and 7B.

Therefore, according to the second embodiment, the operator is assumed to set two-dimensional Gaussian functions having a certain peak value and a certain distribution value, and to set a plurality of center points uniformly distributed in the field of view of a reconstruction image.

Figure 8:
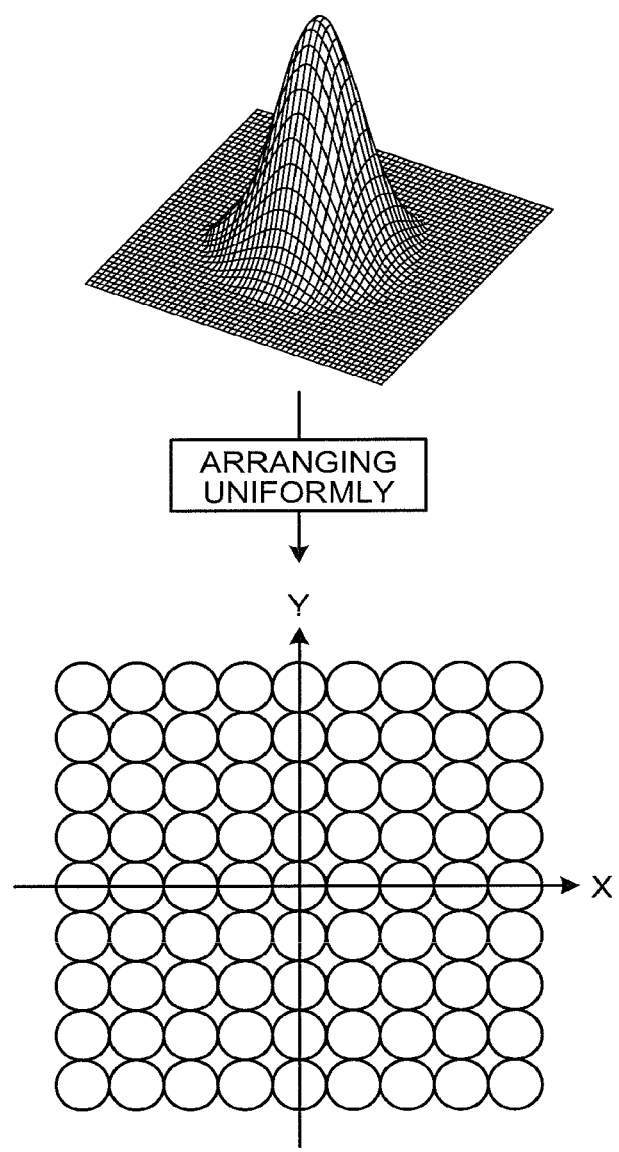
FIG. 8 is a schematic diagram for explaining a Gaussian-function storage unit according to a second embodiment of the present invention.

Accordingly, the Gaussian-function storage unit 36a according to the second embodiment stores therein a plurality of two-dimensional Gaussian functions that is uniformly arranged in the field of view of the reconstruction image and has different center points, as shown in FIG. 8. FIG. 8 is a schematic diagram for explaining a Gaussian-function storage unit according to the second embodiment.

The Gaussian-based expansion-data creating unit 36b creates a group of Gaussian-based expansion data by acquiring a group of one-dimensional Gaussian functions to be a base for expanding each of a group of projection data, with respect to a section orthogonal to the projection direction and running through the center of a reconstruction image, in a plurality of two-dimensional Gaussian functions stored by the Gaussian-function storage unit 36a.

Figure 9:
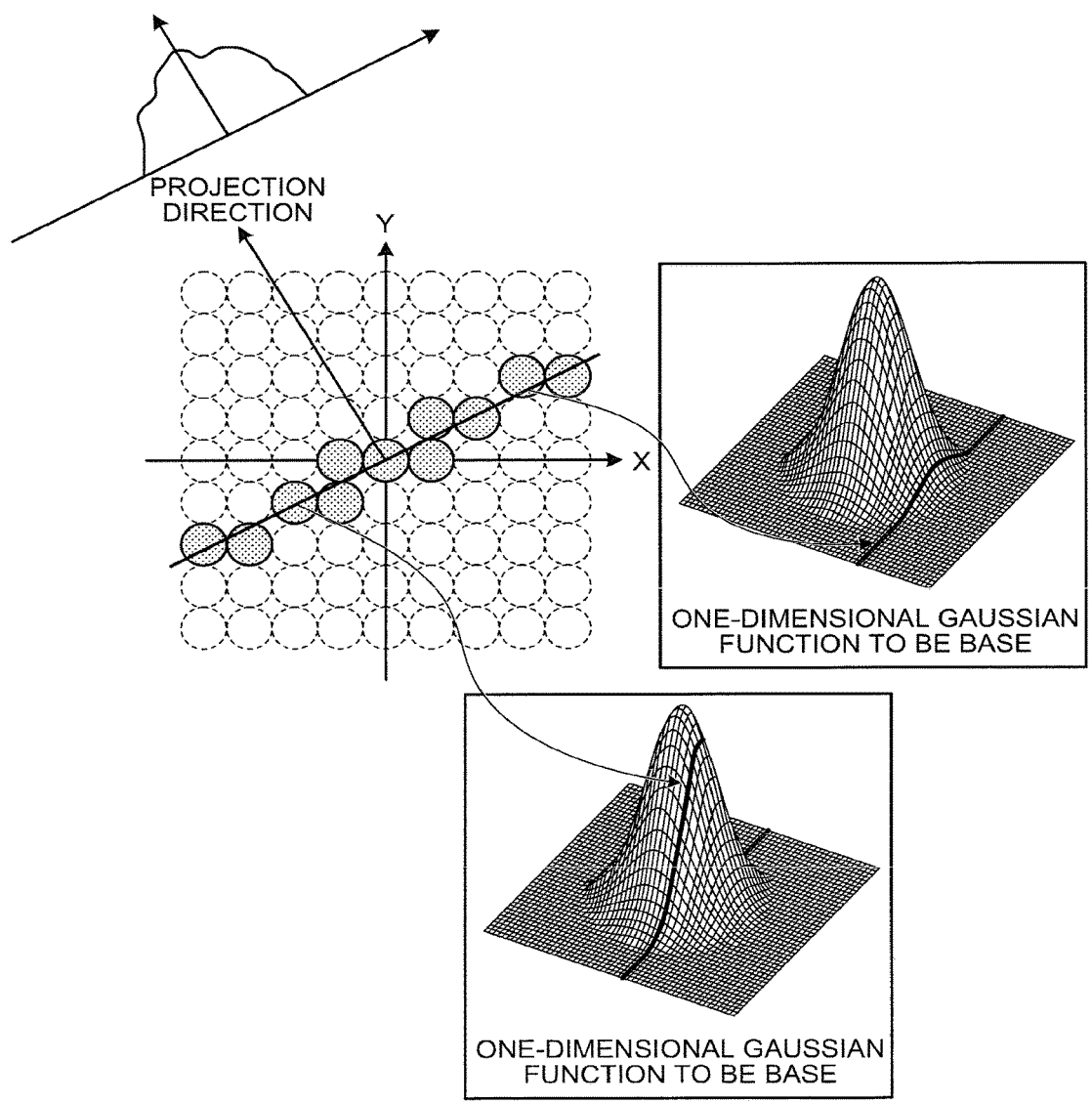
FIG. 9 is a schematic diagram for explaining a Gaussian-based expansion-data creating unit according to the second embodiment.

Precisely, as shown in FIG. 9, the Gaussian-based expansion-data creating unit 36b deems respective one-dimensional Gaussian functions that appear by cutting a plurality of two-dimensional Gaussian functions with a perpendicular section orthogonal to the projection direction of projection data and running through the center of the orthogonal coordinate system at rest (X, Y) to be a group of one-dimensional Gaussian functions to be a base for expansion expanding the projection data. FIG. 9 is a schematic diagram for explaining the Gaussian-based expansion-data creating unit according to the second embodiment.

The Gaussian-based expansion-data creating unit 36b then creates Gaussian-based expansion data from corresponding projection data based on the group of the one-dimensional Gaussian functions as acquired along each projection direction. In other words, the Gaussian-based expansion-data creating unit 36b according to the second embodiment calculates a expansion coefficient by using Expression (3) in a similar manner to the first embodiment. However, according to the second embodiment, the Gaussian function in Expression (3) is a group of one-dimensional Gaussian functions as acquired with respect to each projection data, which is different from the first embodiment.

The reconstruction-image creating unit 36c creates a reconstruction image by using a group of Gaussian-based expansion data as created by the Gaussian-based expansion-data creating unit 36b in a similar manner to the first embodiment. Specifically, the reconstruction-image creating unit 36c sequentially performs the Fourier transform processing, the one-dimensional inverse-Fourier transform processing, and the back projection processing on each of a group of Gaussian-based expansion data, thereby creating a reconstruction image. Alternatively, the reconstruction-image creating unit 36c performs Fourier transform processing and two-dimensional inverse-Fourier transform processing on each of a group of Gaussian-based expansion data, thereby creating a reconstruction image.

The second embodiment is explained above in a case where the Gaussian-based expansion-data creating unit 36b acquires a group of one-dimensional Gaussian functions to be a base from all of two-dimensional Gaussian functions crossing the perpendicular section (see a solid line circle hatched in FIG. 9). However, the present invention is not limited to this, and for example, it can be in a case where the Gaussian-based expansion-data creating unit 36b acquires only functions of each of which the peak value of a one-dimensional Gaussian function obtained with a cross section in a two-dimensional Gaussian function crossing a perpendicular section is higher than a certain value, as a group of one-dimensional Gaussian functions to be a base.

Although the center points are uniformly arranged such that the lower ends of respective two-dimensional Gaussian functions adjoin to each other in FIGS. 8 and 9, the center points can be uniformly arranged in a dense manner such that the lower ends of respective two-dimensional Gaussian functions overlap each other.

Figure 10:
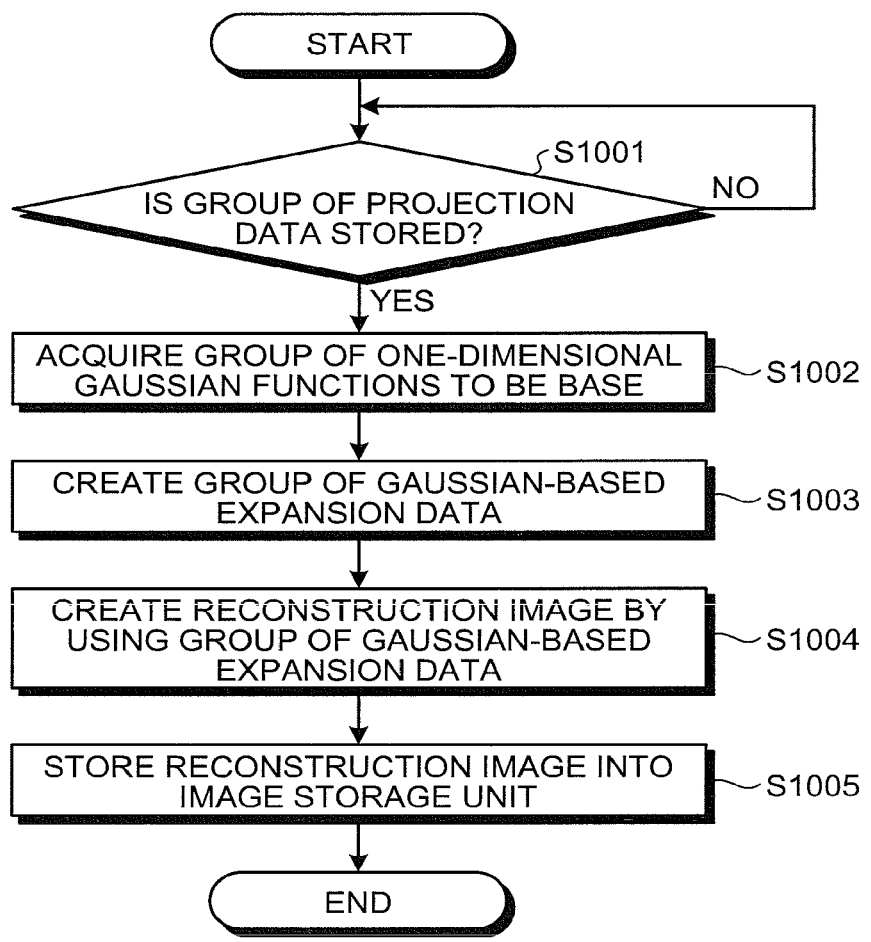
FIG. 10 is a flowchart for explaining image reconstruction processing of an X-ray CT apparatus according to the second embodiment.
Figure 11:
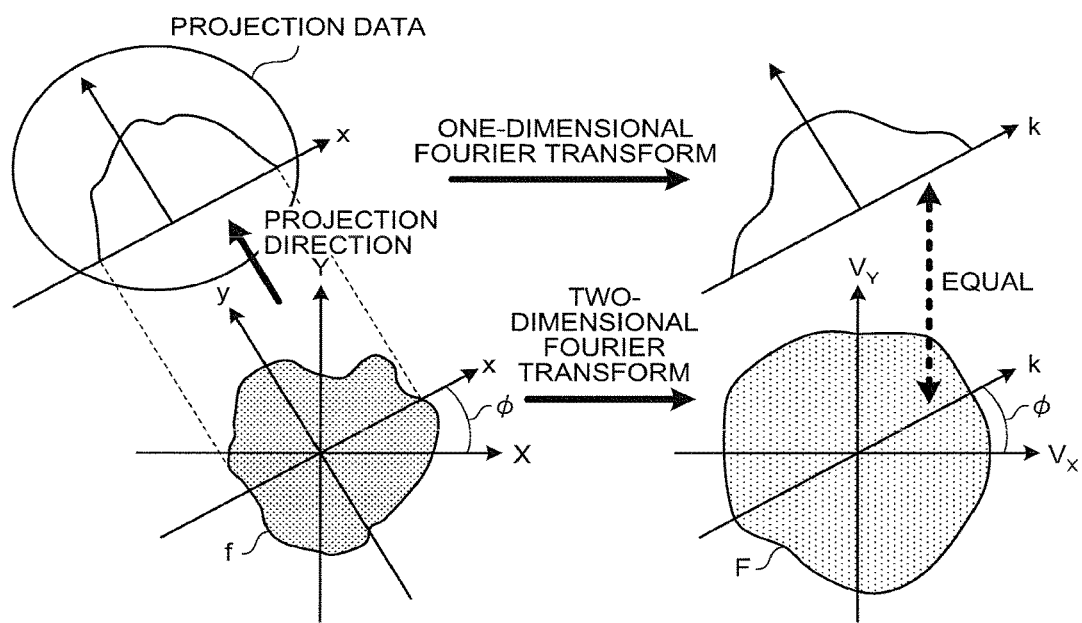
FIG. 11 is a schematic diagram for explaining a Central Section Theorem.

A flow of image reconstruction processing by the X-ray CT apparatus according to the second embodiment is explained below with reference to FIG. 10. FIG. 10 is a flowchart for explaining image reconstruction processing of an X-ray CT apparatus according to the second embodiment.

As shown in FIG. 10, in the X-ray CT apparatus according to the second embodiment, when the projection-data storage unit 35 stores therein a group of projection data (that are preprocessed) (Yes at Step S1001), the Gaussian-based expansion-data creating unit 36*b* acquires a group of one-dimensional Gaussian functions to be a base for expanding each of the group of the projection data (Step S1002).

In other words, the Gaussian-based expansion-data creating unit 36*b* acquires a group of one-dimensional Gaussian functions to be a base for expanding each of a group of projection data, with respect to a section orthogonal to the projection direction and running through the center of a reconstruction image, in a plurality of two-dimensional Gaussian functions that is stored by the Gaussian-function storage unit 36*a*, is uniformly arranged in a field of view of the reconstruction image, and has different center points (see FIG. 9).

The Gaussian-based expansion-data creating unit 36*b* then creates a group of Gaussian-based expansion data from the group of the projection data (Step S1003). In other words, the Gaussian-based expansion-data creating unit 36*b* creates Gaussian-based expansion data by calculating a expansion coefficient from corresponding projection data based on the acquired one-dimensional Gaussian function. The Gaussian-based expansion-data creating unit 36*b* executes such processing on every one of the projection data, thereby creating a group of Gaussian-based expansion data.

Subsequently, the reconstruction-image creating unit 36*c* creates a reconstruction image by using the group of the Gaussian-based expansion data created by the Gaussian-based expansion-data creating unit 36*b* (Step S1004). Specifically, the reconstruction-image creating unit 36*c* sequentially performs Fourier transform processing, one-dimensional inverse-Fourier transform processing, and back projection processing on each of the group of the Gaussian-based expansion data, thereby creating a reconstruction image. Alternatively, the reconstruction-image creating unit 36*c* sequentially performs Fourier transform processing and two-dimensional inverse-Fourier transform processing on each of the group of the Gaussian-based expansion data, thereby creating a reconstruction image.

After that, the reconstruction-image creating unit 36*c* stores the created reconstruction image into the image storage unit 37 (Step S1005), and then terminates the processing.

As described above, according to the second embodiment, because a group of Gaussian functions to be a base in each projection direction is acquired from a plurality of two-dimensional Gaussian functions uniformly arranged in an effective field of view of a reconstruction image, Gaussian-based expansion data can be created from the projection data in the periphery of the field of view with a resolution similar to that of projection data present in the center of the field of view, so that a reconstruction image of a high quality of a uniform spatial resolution without streak artifact can be created.

"Image reconstruction processing by using a plurality of two-dimensional Gaussian functions that is uniformly arranged in an effective field of view of a reconstruction image and has different center points" is not limited to the processing explained in the second embodiment described above, and can be in a case of processing as explained below.

An X-ray CT apparatus according to a third embodiment of the present invention creates a reconstruction image processed from a group of projection data through back projection processing as the image reconstructing unit 36 calculates two-dimensional Gaussian expansion coefficients to be a base for expanding a group of projection data by a plurality of two-dimensional Gaussian functions that is uniformly arranged in an effective field of view of a reconstruction image and has different center points.

In other words, as long as by calculating two-dimensional Gaussian expansion coefficients that can appropriately expand all of a group of projection data by each of "a plurality of two-dimensional Gaussian functions that is uniformly arranged in an effective field of view of a reconstruction image and has different center points", Gaussian-based expansion data expanded by using the calculated two-dimensional Gaussian expansion coefficients turns to data that expresses a two-dimensional distribution of a scan section of the subject P, i.e., a reconstruction image processed from a group of projection data through back projection processing.

To calculate "a two-dimensional Gaussian expansion coefficient that can appropriately expand all of a group of projection data by two-dimensional Gaussian functions", for example, a method explained below can be used. To begin with, the image reconstructing unit 36 acquires "a one-dimensional Gaussian function to be a base" from "one of two-dimensional Gaussian functions uniformly arranged in an effective field of view of a reconstruction image" with respect to each of a plurality of "perpendicular sections orthogonal to respective projection directions and running through the center of the reconstruction image", the perpendicular sections crossing the two-dimensional Gaussian function (hereinafter, "center sections").

In other words, the image reconstructing unit 36 acquires a plurality of "one-dimensional Gaussian functions to be a base" with respect to respective center sections crossing the two-dimensional Gaussian function and having different angles of the respective projection directions, with respect to each of two-dimensional Gaussian functions uniformly arranged in the effective field of view of the reconstruction image.

The image reconstructing unit 36 then calculates a two-dimensional Gaussian expansion coefficient for expanding all of projection data corresponding the projection direction by the acquired "one-dimensional Gaussian functions to be a base" with respect to each projection direction. The image reconstructing unit 36 then creates data that all projection data corresponding to the projection direction are expanded with the calculated two-dimensional Gaussian expansion coefficient and the corresponding two-dimensional Gaussian function.

The image reconstructing unit 36 then executes the above processing with respect to all of the two-dimensional Gaussian functions, thereby creating Gaussian-based expansion data that all of the group of the projection data are expanded with a two-dimensional Gaussian expansion coefficient appropriately expanded by the two-dimensional Gaussian function, i.e., a reconstruction image.

In this way, according to the third embodiment, a reconstruction image of a high quality that statistical noises and streak artifacts are removed can be rapidly created.

Although the first to third embodiments described above are explained in cases where the present invention is applied to an X-ray CT apparatus, the present invention can be applied to other radiodiagnosis apparatuses, such as a Positron Emission computed Tomography (PET) apparatus, or a Single Photon Emission Computed Tomography (SPECT), or non-destructive examination equipment.

Moreover, although the first to third embodiments described above are explained in cases of creating a two-dimensional image as a reconstruction image, the present invention can be applied to a case of creating a three-dimensional image as a reconstruction image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reconstructing method comprising:
creating by a radiodiagnosis apparatus a group of Gaussian-based expansion data that is expanded from each of a group of projection data through linear combination based on a plurality of Gaussian functions having different center points uniformly distributed at positional coordinates; and
creating by the radiodiagnosis apparatus a reconstruction image by sequentially performing one of two sequences of processing on each of the group of the Gaussian-based expansion data, the two sequences of processing including a sequence of Fourier transform processing, one-dimensional inverse-Fourier transform processing, and back projection processing, and a sequence of Fourier transform processing and two-dimensional inverse-Fourier transform processing, wherein
the radiodiagnosis apparatus executes Fourier transform on each of the group of the Gaussian-based expansion-data by calculating a simple sum of product directly using a corresponding expansion coefficient that is calculated when expanding each of the group of projection data by a corresponding one of the Gaussian functions wherein statistical noises are removed from the projection data while high-frequency components corresponding to profile information about internal structures are left without executing a low-pass filter processing.

2. The image reconstructing method according to claim 1, wherein the creating the group of Gaussian-based expansion data comprises creating the group of the Gaussian-based expansion data by acquiring a group of one-dimensional Gaussian functions to be a base for expanding each of the group of the projection data with respect to a cross section orthogonal to a projection direction in a plurality of two-dimensional Gaussian functions that is uniformly arranged in a field of view of the reconstruction image and has different center points distributed at positional coordinates.

3. An image reconstructing method comprising:
creating by a radiodiagnosis apparatus a reconstruction image processed from a group of projection data through back projection processing by calculating two-dimensional Gaussian-expansion coefficients to be a base for expanding the group of the projection data by a plurality of two-dimensional Gaussian functions that is uniformly arranged in a field of view of a reconstruction image and has different center points distributed at positional coordinates wherein statistical noises are removed from the projection data while high-frequency components corresponding to profile information about internal structures are left without executing a low-pass filter processing.

* * * * *